(12) United States Patent
Jin et al.

(10) Patent No.: US 7,483,087 B2
(45) Date of Patent: Jan. 27, 2009

(54) IN-PLANE SWITCHING MODE LIQUID CRYSTAL DISPLAY DEVICE WITH HEATING LINE AND METHOD THEREOF

(75) Inventors: Hyun Suk Jin, Gunpo-shi (KR); Ho Jin Ryu, Uiwang-si (KR)

(73) Assignee: LG. Display Co., Ltd., Seoul (KR)

( * ) Notice: Subject to any disclaimer, the term of this patent is extended or adjusted under 35 U.S.C. 154(b) by 669 days.

(21) Appl. No.: 11/169,042

(22) Filed: Jun. 28, 2005

(65) Prior Publication Data

US 2006/0055859 A1    Mar. 16, 2006

(30) Foreign Application Priority Data

Sep. 13, 2004    (KR) ..................... 10-2004-0073150

(51) Int. Cl.
G02F 1/133 (2006.01)
(52) U.S. Cl. ......................................... 349/21; 349/141
(58) Field of Classification Search .................... 349/21
See application file for complete search history.

(56) References Cited

U.S. PATENT DOCUMENTS 5,559,614 A * 9/1996 Urbish et al. .................. 349/21

* cited by examiner

*Primary Examiner*—Richard H Kim
(74) *Attorney, Agent, or Firm*—Brinks Hofer Gilson & Lione

(57) ABSTRACT

An in-plane switching (IPS) mode liquid crystal display (LCD) device is disclosed which includes a heater line to achieve an improvement in reliability under low temperature conditions. The LCD device includes a first substrate and a second substrate which face each other, a gate line and a data line which are formed on the first substrate such that the gate line and the data line cross each other to define a pixel region, a common electrode and a pixel electrode which are formed on the first substrate in the pixel region, a heater line formed on the first substrate such that the heater line corresponds to the common electrode adjacent to one side of the data line, and a liquid crystal layer formed between the first substrate and the second substrate.

17 Claims, 12 Drawing Sheets

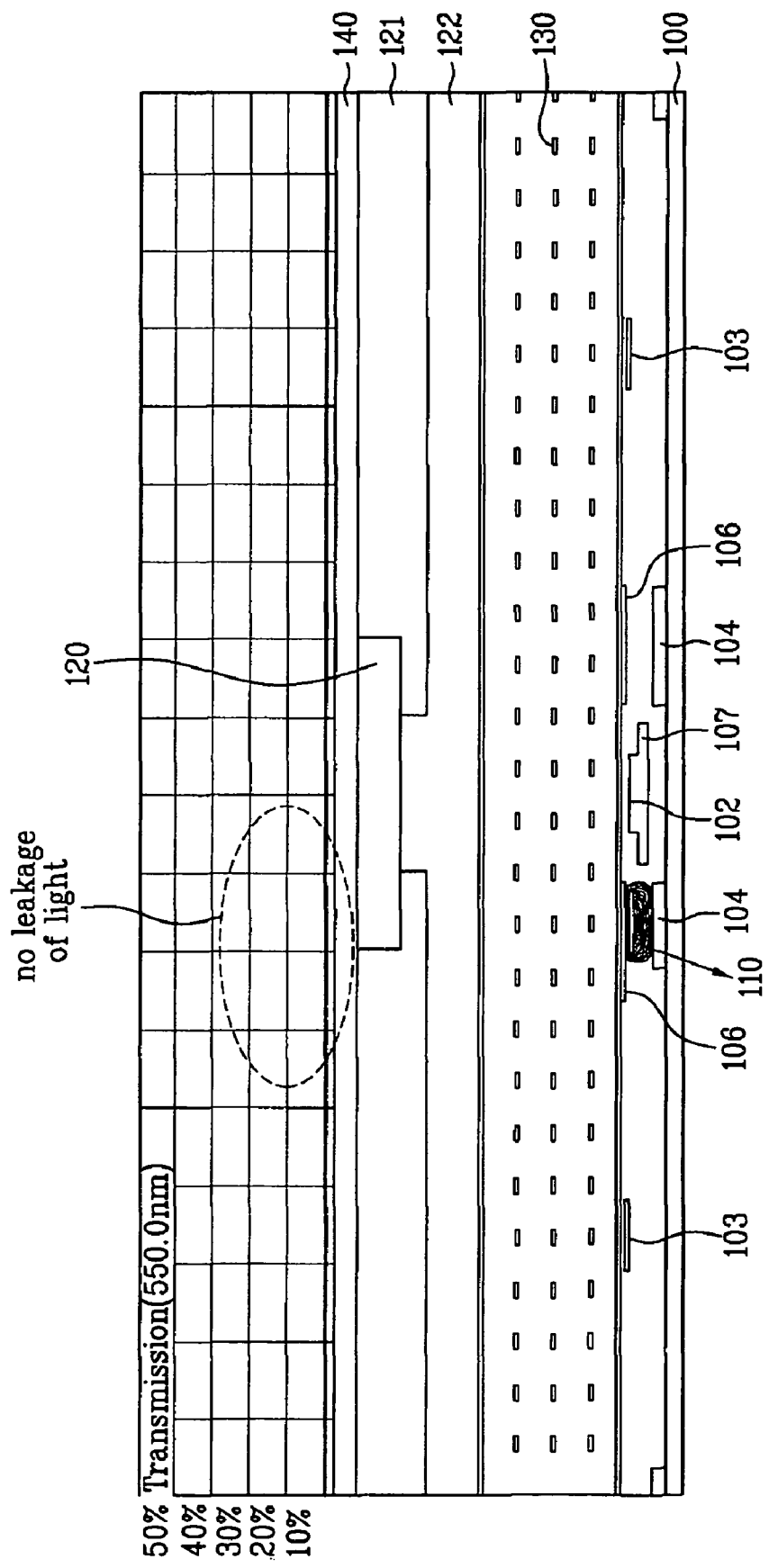

IN-PLANE SWITCHING MODE LIQUID CRYSTAL DISPLAY DEVICE WITH HEATING LINE AND METHOD THEREOF

This application claims the benefit of the Korean Patent Application No. P2004-73150, filed on Sep. 13, 2004, which is hereby incorporated by reference as if fully set forth herein.

BACKGROUND OF THE INVENTION

1. Field of the Invention

The present invention relates to a liquid crystal display device, and more particularly, to an in-plane switching mode LCD device which includes a heater line to achieve an improvement in reliability under low temperature conditions.

2. Discussion of the Related Art

With the progress of information-dependent society, the demand for various display devices has increased. To meet such a demand, efforts have recently been made to research flat panel display devices such as liquid crystal displays (LCDs), plasma display panels (PDPs), electro-luminescent displays (ELDs), vacuum fluorescent displays (VFDs), and the like. Some types of such flat panel display devices are being practically applied to various appliances for display purposes.

In particular, LCDs have been used as a substitute for cathode ray tubes (CRTs) in association with mobile image display devices because LCDs have advantages of superior picture quality, lightness, thinness, and low power consumption. Thus, LCDs are currently widely used. Various applications of LCDs are being developed in association with not only mobile image display devices such as monitors of notebook computers, but also monitors of TVs to receive and display broadcast signals, and monitors of laptop computers.

Successful application of such LCDs to diverse image display devices depends on whether or not the LCDs can realize desired high picture quality, including high resolution, high brightness, large display area, and the like, while maintaining desired characteristics of lightness, thinness, and low power consumption.

Such an LCD mainly includes a liquid crystal panel for displaying an image, and a driver for applying a drive signal to the liquid crystal panel. The liquid crystal panel includes a first substrate and a second substrate joined together in such a manner that a space is defined between the first and second substrates, and a liquid crystal layer sealed in the space between the first and second substrates.

The first substrate (TFT array substrate) includes a plurality of gate lines arranged in one direction while being uniformly spaced apart from one another, and a plurality of data lines arranged in a direction perpendicular to the gate lines while being uniformly spaced apart from one another. The first substrate also includes a plurality of pixel electrodes arranged in a matrix array at respective pixel regions each defined by an intersection between each gate line and each data line, and a plurality of thin film transistors (TFTs), each of which is switched on by a signal on an associated one of the gate lines, and transmits a signal on an associated one of the data lines to an associated one of the pixel electrodes.

The second substrate (color filter substrate) includes a black matrix layer for blocking incidence of light to a region other than the pixel regions, R, G, and B color filter layers for reproducing color tones, and a common electrode for reproducing an image.

The driving principle of the above-mentioned general LCD utilizes optical anisotropy and polarization of the liquid crystal. Since liquid crystal has a thin and elongated molecular structure, molecules thereof have an orientation in a certain direction. It is possible to control the orientation of liquid crystal molecules by intentionally applying an electric field to the liquid crystal molecules.

In accordance with such a control for the orientation of liquid crystal molecules, the arrangement of liquid crystal molecules is varied, so that the liquid crystal molecules exhibit optical anisotropy. Since light incident to the liquid crystal is refracted in the direction in which the liquid crystal molecules are oriented, image information is represented.

The LCD having the above-mentioned driving principle is called a "twisted nematic (TN) mode LCD". Since such a TN mode LCD has a drawback of a narrow viewing angle, an in-plane switching (IPS) mode LCD has been developed to overcome the drawback of the TN mode LCD.

In the IPS mode LCD, a pixel electrode and a common electrode are formed on a first substrate at each pixel region of the first substrate such that the pixel electrode and common electrode extend parallel to each other while being horizontally spaced apart from each other to generate an in-plane electric field (horizontal field). The liquid crystal layer is oriented in a certain direction by the in-plane electric field.

Meanwhile, LCDs perform display of an image in accordance with orientation of liquid crystals. Liquid crystals exhibit characteristics of abnormal response speed, elasticity, and dielectric constant at an abnormal temperature. For this reason, in LCDs, it is difficult to achieve normal display of an image under abnormal temperature conditions. In LCDs, which may be under abnormal temperature conditions, accordingly, a temperature sensor is used to sense the abnormal temperature condition, and thus, to allow the characteristics of liquid crystals to be compensated for in accordance with the sensed abnormal temperature condition.

Generally, such a temperature sensor is mounted to a driver or module arranged outside the liquid crystal panel of an LCD, so as to sense a temperature of the liquid crystal panel.

In fields where LCDs are used, in particular, aerospace fields where liquid crystal panels may be exposed to low temperature conditions, efforts have been made to heat a liquid crystal panel to cope with a low temperature condition.

Hereinafter, temperature dependency of liquid crystals and a conventional IPS mode LCD device will be described with reference to the annexed drawings.

FIG. 1 is a graph depicting the response characteristics of liquid crystals varying depending on a variation in temperature. FIG. 2 is a graph depicting a variation in the voltage-dependent transmittance of liquid crystals depending on a variation in temperature.

After observing respective response characteristics of liquid crystals at 0° C., 20° C., and −20° C., as shown in FIG. 1, it can be seen that the response time taken for the liquid crystals to be changed from a white state (transmittance of 100%) to a black state (transmittance of 0%) or the time taken for the liquid crystals to be restored from the black state to the white state is longer at a lower temperature of the liquid crystals because the response speed of the liquid crystals is lower at the lower temperature of the liquid crystals. In particular, at room temperature in which the temperature of the liquid crystals ranges from 0° C. to 40° C., it is possible to obtain a desired response speed range of the liquid crystals. At a temperature of −20° C., however, the liquid crystals exhibit a very low response speed. In this case, it is difficult to normally display a rapidly-varying image such as a video image.

Referring to FIG. 2, it can also be seen that the transmittance of liquid crystals exhibited at a constant application voltage varies depending on a variation in temperature such that a lower transmittance is obtained at a lower temperature (transmittance: −20° C.<0° C.<20° C.).

Generally, LCD devices display an image by varying the optical anisotrophy of liquid crystals having properties intermediate between liquids and solids, that is, the flowability of liquid and the optical properties of crystals. The liquid crystals are varied in transmittance and opto-electric characteristics depending on a variation in temperature. Accordingly, the temperature conditions, to which an LCD device is exposed, are an important factor in implementing desired display in the LCD device.

Therefore, although liquid crystals exhibit a variation in response speed depending on a variation in temperature, it would be expected that, if an LCD device is exposed to room temperature conditions of 0° C. to 40° C., or if the driving characteristics of the LCD device are compensated for through a temperature compensation means connected to the LCD device when the ambient temperature of the LCD device is an abnormally high or low temperature, the LCD device can exhibit normal driving characteristics.

FIG. 3 is a plan view illustrating a general IPS mode LCD device. FIG. 4 is a cross-sectional view taken along the line I-I' of FIG. 3.

As shown in FIGS. 3 and 4, the general IPS mode LCD device mainly includes a lower substrate 10, an upper substrate 20, which faces the lower substrate 10, and a liquid crystal layer 30 sealed between the two substrates 10 and 20.

Gate lines 11 and data lines 12 are formed on the lower substrate 10 such that the gate lines 11 and data lines 12 extend horizontally and vertically, respectively, to cross each other, thereby defining pixel regions. A common electrode 13 and a pixel electrode 15 are formed on the lower substrate 10 at each pixel region such that the common electrode 13 and pixel electrode 15 are spaced apart from each other. For simplicity, the following description will be given only in conjunction with one pixel region.

A TFT is also formed on the lower substrate 10. The TFT includes a gate electrode 11a formed on the lower substrate 10 such that the gate electrode 11a is protruded from the gate line 11. The TFT also includes a semiconductor layer 18 formed over the entire surface of the lower substrate 10 including the gate electrode 11a such that the semiconductor layer 18 overlaps with the gate electrode 11a in a state in which a gate insulating film 14 is interposed between the gate electrode 11a and the semiconductor layer 18. The TFT further includes a source electrode 12a and a drain electrode 12b formed at opposite sides of the semiconductor layer 18, respectively. The source electrode 12a is protruded from the data line 12. The drain electrode 12b is spaced apart from the source electrode 12a by a predetermined distance, and is connected to the pixel electrode 15.

The common electrode 13 is spaced apart from the pixel electrode 15 by the predetermined distance, and is formed on the layer, on which the gate line 11 or data line 12 is formed, simultaneously with the formation of the gate line 11 or data line 12. In the illustrated case, the common electrode 13 is formed on the layer on which the gate line 11 is formed.

An insulating film 16 is also deposited such that the insulating film 16 is interposed between the data line 12 and the pixel electrode 15. The insulating film 16 is made of the same material as the gate insulating film 14. For example, the insulating film 16 is made of an inorganic insulating material such as SiNx or SiOx, or an organic insulating material such as acryl resin, polyimide, benzocyclobutene (BCB), or photo polymer.

A protective film 17 is then formed over the entire surface of the lower substrate 10 including the insulating film 16 and pixel electrode 15.

The common electrode 13 is coupled to a common line 19 to receive a voltage signal. When the voltage signal is applied to the pixel electrode 15 via the drain electrode 12b, an in-plane electric field is generated, thereby driving the liquid crystal layer 30.

On the other hand, on the upper substrate 20, a black matrix layer 21 is formed to block incidence of light to a region other than the pixel regions. Color filter layers 22 for reproducing R, G, and B color tones, and an overcoat layer 23 for planarizing color films of the color filter layers 22 are also formed on the upper substrate 20.

The illustrated case corresponds to the optical mode of a general IPS mode LCD device, that is, a normally black mode. Accordingly, when no voltage is applied, the illustrated IPS mode LCD device is maintained in a black state in which transmission of light is prevented.

When a voltage is applied to the pixel electrode 15 and common electrode 13 formed on the same substrate, an electric field is generated between the two electrodes 13 and 15. The liquid crystals in the liquid crystal layer 30 are oriented along the electric field.

As a result, internal light passes through the liquid crystal layer 30 along the oriented liquid crystals, so that white is displayed.

As mentioned above, the common electrode 13 and pixel electrode 15 are formed on the same layer in the lower substrate 10. The liquid crystals interposed between the lower substrate 10 and the upper substrate 20, which are joined together to define a certain space therebetween, are driven by an electric field generated between the common electrode 13 and the pixel electrode 15. In this case, since the liquid crystals have positive dielectric anisotrophy, they have characteristics wherein the longer axis of the liquid crystals are oriented in the direction of the electric field.

In an OFF state in which no in-plane electric field is applied to the common electrode 13 or pixel electrode 15, the orientation of the liquid crystals does not vary. However, in an ON state in which an in-plane electric field is applied to the common electrode 13 and pixel electrode 15, the orientation of the liquid crystals varies. That is, in the ON state, the liquid crystals are oriented while having a twist angle of about 45°, contrary to the OFF state.

In such a conventional IPS mode LCD device, a temperature sensor is arranged outside the liquid crystal panel of the LCD device, in order to sense an internal temperature of the liquid crystal panel. A temperature compensation means is also arranged outside the liquid crystal panel. Through this arrangement, the liquid crystal panel is maintained at a normal temperature even under abnormal ambient temperature conditions.

However, the above-mentioned conventional IPS mode LCD device has various problems.

That is, liquid crystals generally used in LCDs are sensitive to temperature, and do not perform a normal response under low or abnormally high temperature conditions. For this reason, it is necessary to conduct a compensation coping with such an abnormal temperature condition.

In particular, application of LCDs to aerospace fields associated with aircraft and spacecraft and military fields are currently increasing. For this application, it is necessary to secure reliability under severe low temperature conditions, as compared to other fields.

To this end, a heat line is used in LCDs which may possibly be exposed to abnormally low temperature conditions.

However, such a heater line, which is applied to an LCD device to secure reliability under low temperature conditions, is generally formed outside the liquid crystal panel of the LCD device or inside the liquid crystal panel. Where the heater line is formed inside the liquid crystal panel, the heater line may be formed over the entire surface of the liquid crystal panel or on a part of the liquid crystal panel which is not clearly defined. For this reason, an abnormal orientation of liquid crystals occurs at a region where the heat line is exposed, thereby causing undesirable leakage of light.

In particular, in IPS mode LCD devices, problems of difficulty in securing a desired aspect ratio and undesirable leakage of light may occur in accordance with the position of the heat line.

SUMMARY OF THE INVENTION

Accordingly, the present invention is directed to an IPS mode LCD device that substantially obviates one or more problems due to limitations and disadvantages of the related art.

An IPS switching mode LCD device having a heater line vertically interposed between electrodes of a double electrode structure, thereby being capable of preventing leakage of light from occurring in a black state due to the application of the heater line to an in-plane switching mode.

An IPS mode liquid crystal display device comprises a first substrate and a second substrate which face each other, a gate line and a data line formed on the first substrate such that the gate line and the data line cross each other to define a pixel region, a first common electrode and a pixel electrode formed on the first substrate in the pixel region, a heater line formed on the first substrate beneath the first common electrode and adjacent to the data line, and a liquid crystal layer formed between the first substrate and the second substrate.

An IPS mode liquid crystal display device comprises a first substrate and a second substrate which face each other; a gate line and a data line formed on the first substrate such that the gate line and the data line cross each other to define a pixel region, a common electrode and a pixel electrode formed on the first substrate in the pixel region, a heater line formed on the first substrate such that the heater line corresponds to the common electrode and is adjacent to the data line, and a liquid crystal layer formed between the first substrate and the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 15 is a simulation diagram illustrating a transmittance of the IPS mode LCD device according to the fourth embodiment of the present invention at each region of the IPS mode LCD device.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

IPS mode LCD devices according to respective embodiments of the present invention, which will be described hereinafter, each include a heater line at one side of a data line, and a common electrode formed over or beneath the heater line, in order to achieve a function for recovering the state of the LCD device from a low temperature state to a room temperature state. That is, when the LCD device is in a low temperature state in accordance with exposure thereof to a low temperature condition, a voltage is applied to the heater line arranged inside the liquid crystal panel of the LCD device, so that the heater line generates heat, thereby restoring the LCD device from the low temperature state to the room temperature state.

First Embodiment

Figure 1:
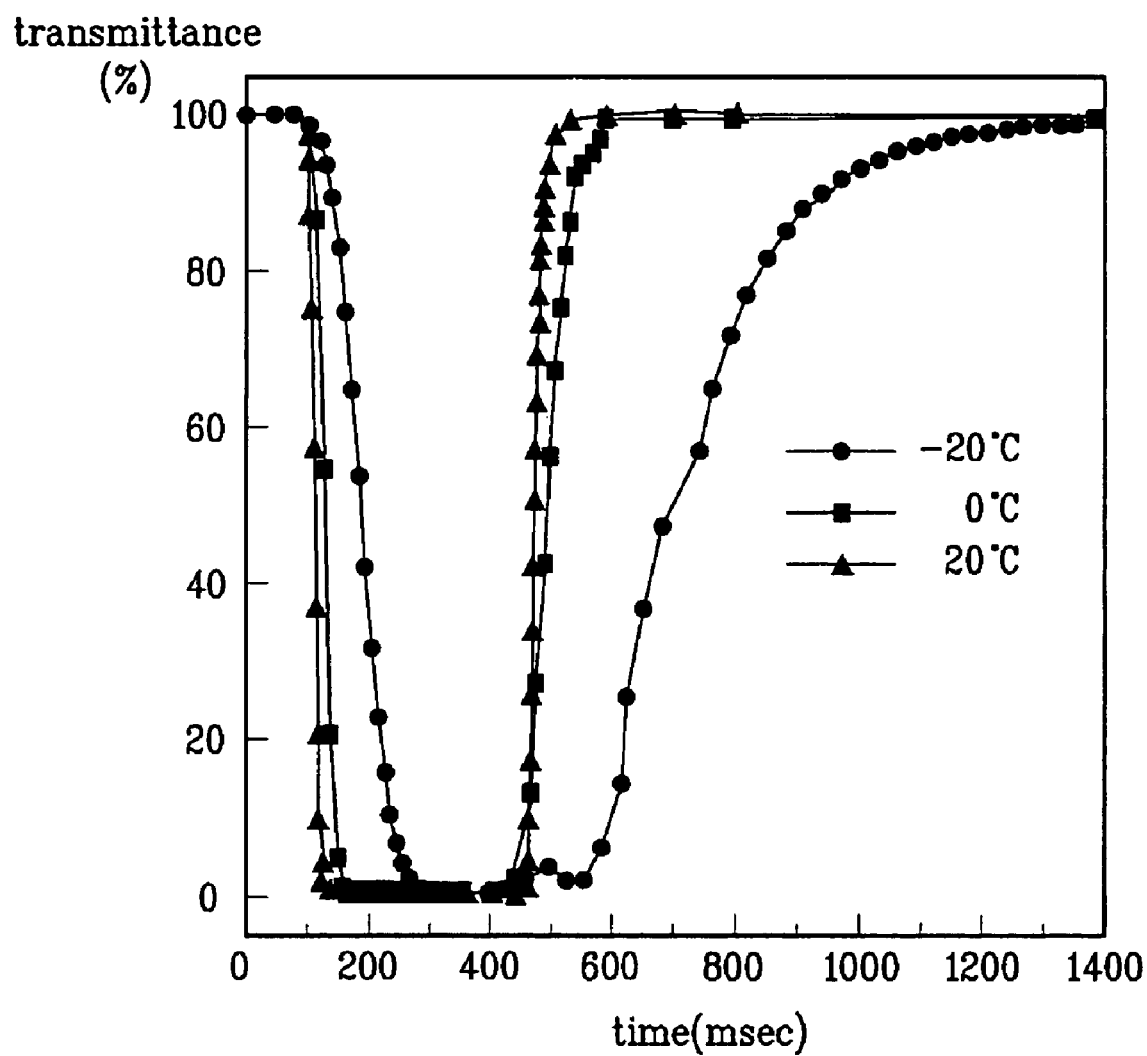
FIG. 1 is a graph depicting the response characteristics of liquid crystals varying depending on a variation in temperature.
Figure 2:
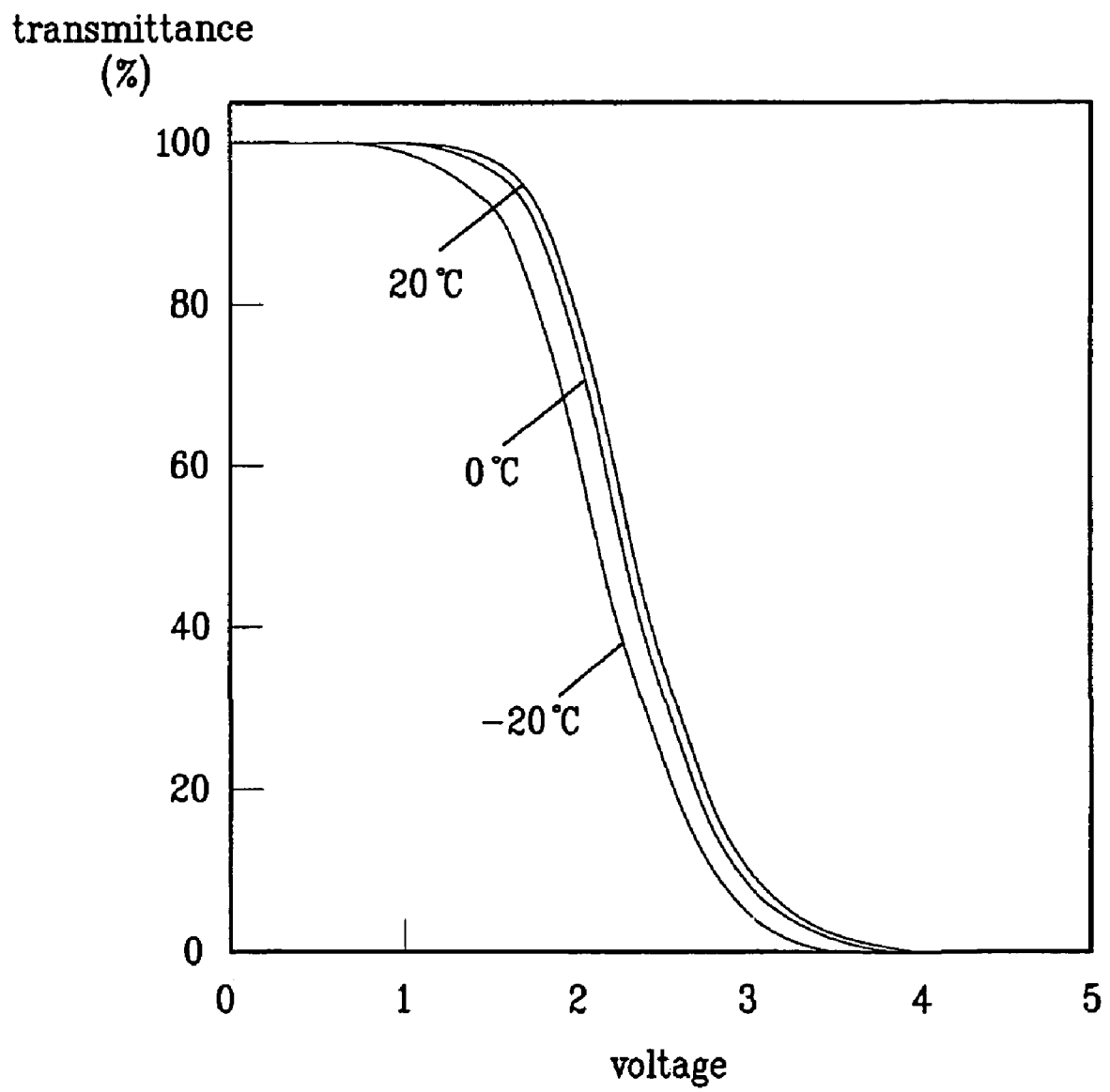
FIG. 2 is a graph depicting a variation in the voltage-dependent transmittance of liquid crystals depending on a variation in temperature.
Figure 3:
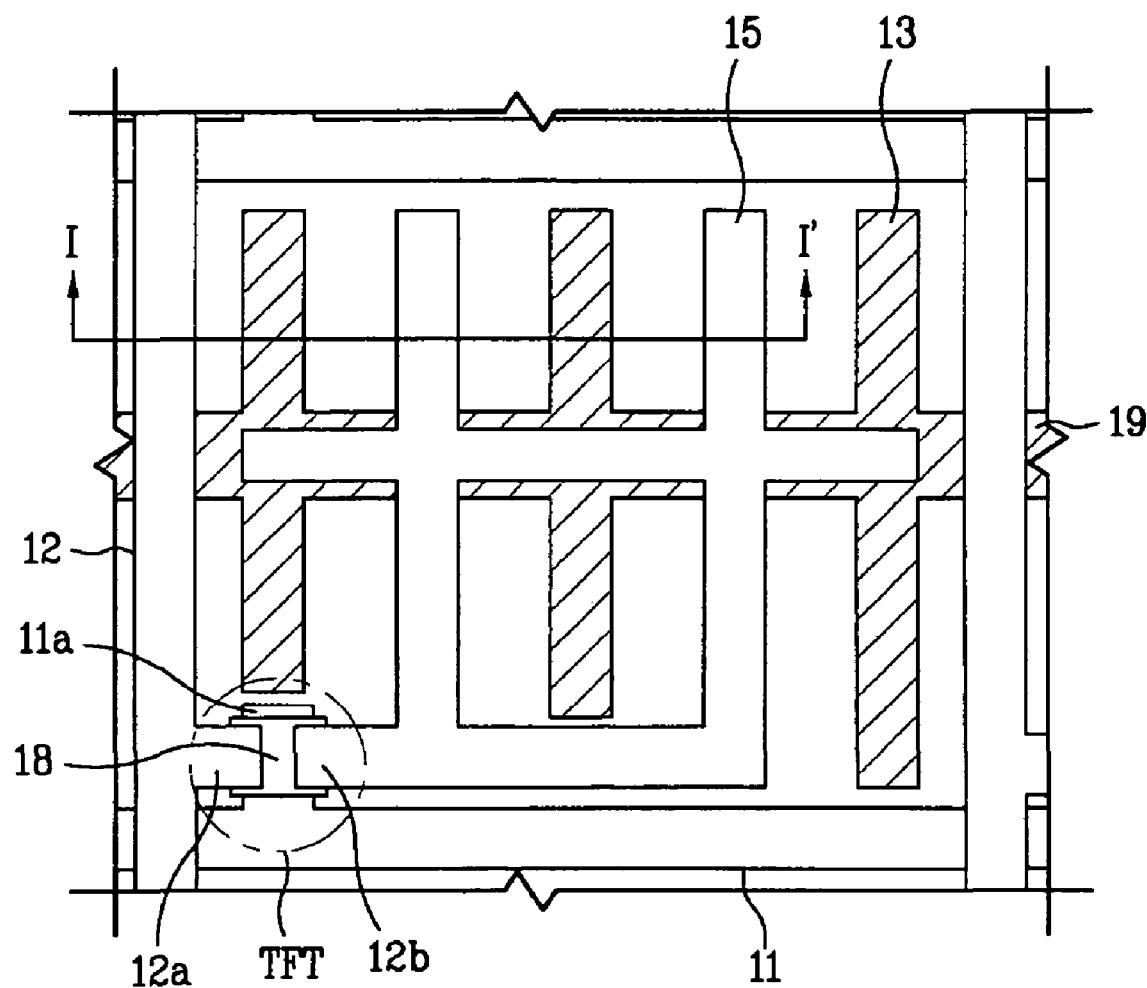
FIG. 3 is a plan view illustrating a general IPS mode LCD device.
Figure 4:
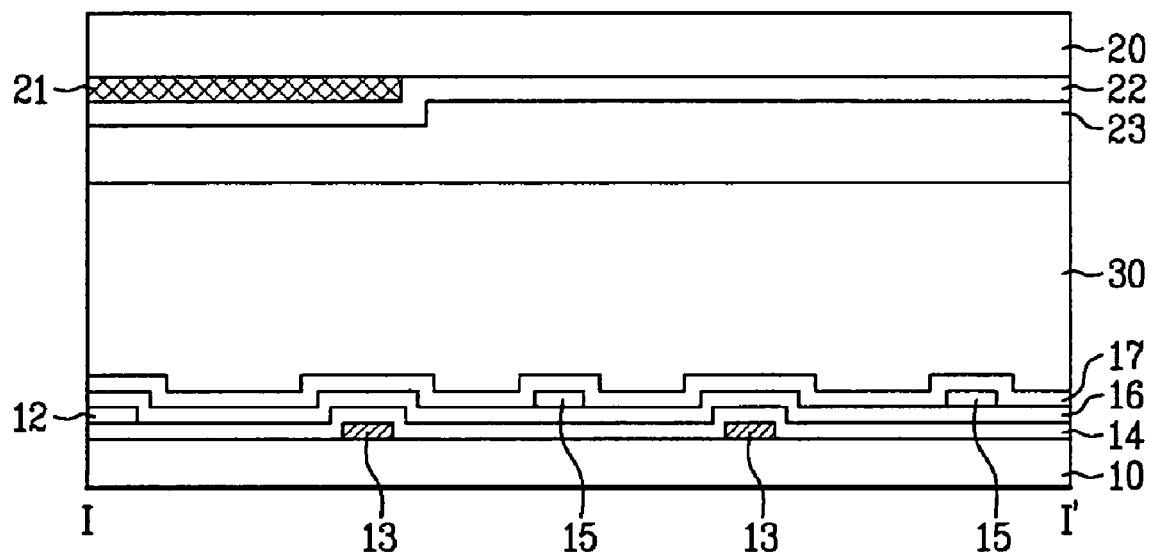
FIG. 4 is a cross-sectional view taken along the line I-I' of FIG. 3.
Figure 5:
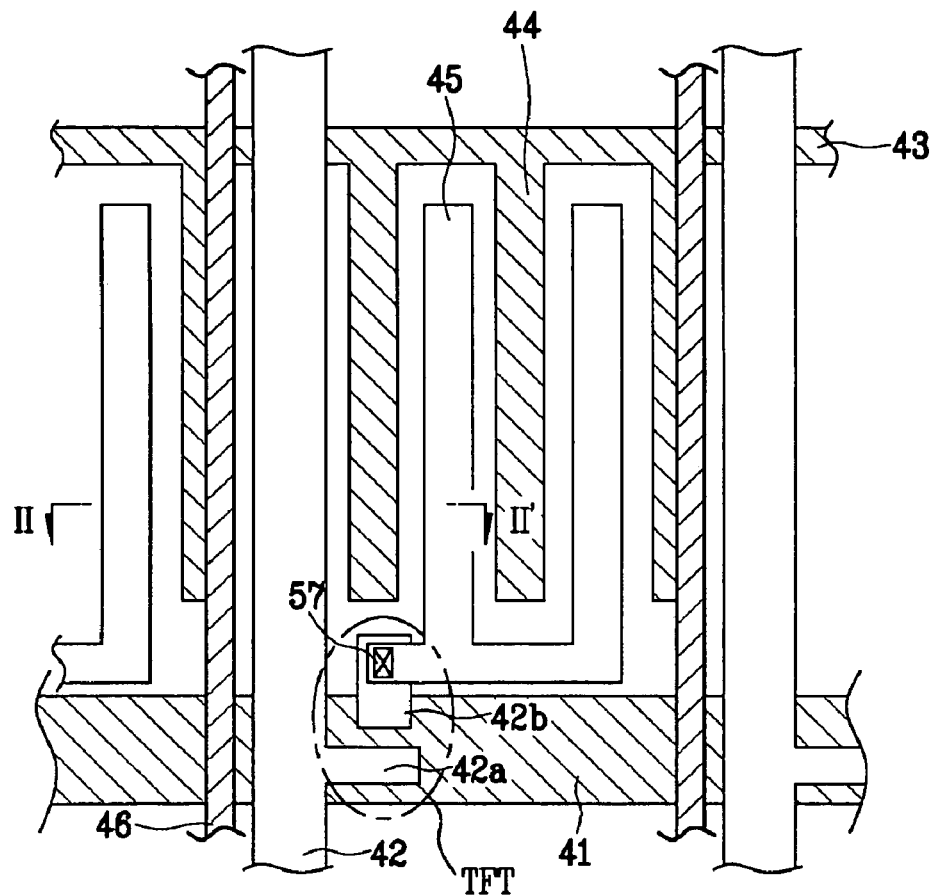
FIG. 5 is a plan view illustrating an IPS mode LCD device according to a first embodiment of the present invention.
Figure 6:
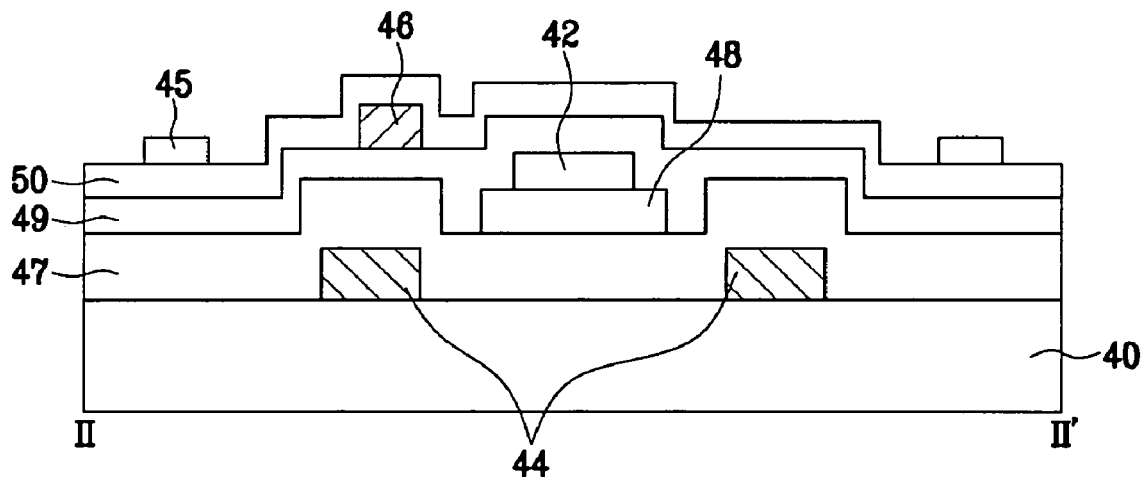
FIG. 6 is a cross-sectional view taken along the line II-II of FIG. 5.
Figure 7:
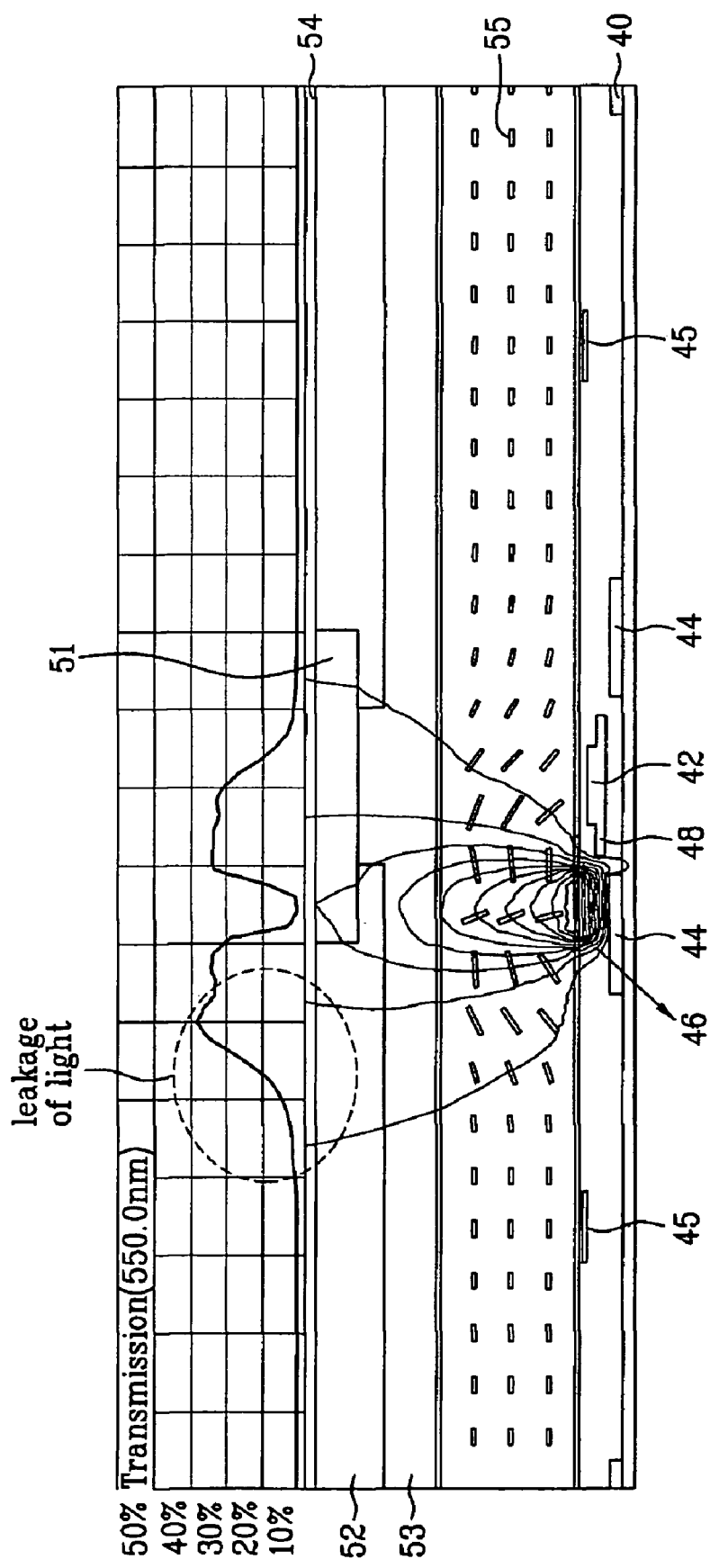
FIG. 7 is a simulation diagram illustrating a transmittance of the IPS mode LCD device according to the first embodiment of the present invention at each region of the IPS mode LCD device.

FIG. 5 is a plan view illustrating an IPS mode LCD device according to a first embodiment of the present invention. FIG. 6 is a cross-sectional view taken along the line II-II of FIG. 5. FIG. 7 is a simulation diagram illustrating a transmittance of the IPS mode LCD device according to the first embodiment of the present invention at each region of the IPS mode LCD device.

As shown in FIGS. 5 and 6, the IPS mode LCD device according to the first embodiment of the present invention mainly includes a first substrate 40, an second substrate ("54"

in FIG. 7), which faces the first substrate 40, and a liquid crystal material ("55" in FIG. 7) sealed between the two substrates 40 and 54.

Gate lines 41 and data lines 42 are formed on the first substrate 40 such that the gate lines 41 and data lines 42 extend horizontally and vertically, respectively, to cross each other, thereby defining pixel regions. A common electrode 44 and a pixel electrode 45 are formed on the first substrate 40 at each pixel region such that the common electrode 44 and pixel electrode 45 are spaced apart from each other. Each of the common electrode 44 and the pixel electrode 45 has portions alternately arranged with portions of the other one of the common electrode 44 and the pixel electrode 45. For simplicity, the following description will be described only in conjunction with one pixel region. A heat line 46 is formed on the common electrode 44 adjacent to one side of the data line 42. The common electrode 44 and pixel electrode 45 extend parallel to the data line 42.

A TFT is also formed on the first substrate 40. The TFT includes a gate electrode (not shown) protruded from the gate line 41, a source electrode 42a protruded from the data line 42, and a drain electrode 42b formed to be spaced apart from the source electrode 42a by a predetermined distance. Although not shown, the gate electrode is formed between the source electrode 42a and the drain electrode 42b. A semiconductor layer 48 is formed on the first substrate 40 beneath a region where the data line 42, source electrode 42a, and drain electrode 42b are arranged, and beneath a region defined between the source electrode 42a and the drain electrode 42b. The drain electrode 42b of the TFT is coupled to the pixel electrode 45 via a contact hole 57 which is formed through a second interlayer insulating film 50 and a first interlayer insulating film 49.

The common electrode 44 is protruded from a common line 43 extending parallel to the gate line 41, and is spaced apart from the pixel electrode 45 by the predetermined distance. The common electrode 44 is also formed on the layer, on which the gate line 41 or data line 42 is formed, simultaneously with the formation of the gate line 41 or data line 42. In the illustrated case, the common electrode 44 is formed on the layer on which the gate line 41 is formed.

The common line 43 including the common electrode 44 formed on the layer, on which the gate line 41 is formed, and the gate line 41 are made of metal such as aluminum (Al), chromium (Cr), molybdenum tungsten (MoW), copper (Cu), or copper alloy. On the other hand the pixel electrode 45 is made of a transparent electrode material such as indium tin oxide (ITO), indium zinc oxide (IZO), or indium tin zinc oxide (ITZO).

Meanwhile, the heater line 46 is made of light-shielding metal such as aluminum (Al), chromium (Cr), molybdenum tungsten (MoW), copper (Cu), or copper alloy.

A gate insulating film 47 is formed among the gate line 41, the common line 43 including the common electrode 44, and the data line 42. The first interlayer insulating film 49 is formed between the data line 42 and the heater line 46, whereas the second interlayer insulating film 50 is formed between the heater line 46 and the pixel electrode 45. The gate insulating film 47, first interlayer insulating film 49, and second interlayer insulating film 50 are made of an inorganic insulating material such as SiNx or SiOx, or an organic insulating material such as acryl resin, polyimide, BCB, or photo polymer.

In the illustrated case, as shown in FIG. 6, the semiconductor layer 48 is formed on a plane lower than the data line 42 and source/drain electrodes 42. Accordingly, the array process of the first substrate 40 is a 4-mask process. The patterning of the data line 42 is carried out using the same mask as that of the semiconductor layer 48 (a channel is defined in the semiconductor layer using a diffraction exposure mask).

Since the common electrode 44 extends from the common line 43, a common voltage signal on the common line 43 is applied to the common electrode 44. Meanwhile, a pixel voltage signal is applied to the pixel electrode 45 via the drain electrode 42b. When the common voltage signal and pixel voltage signal are simultaneously applied, an in-plane electric field is generated between the common electrode 44 and the pixel electrode 45, so that liquid crystals 55 are horizontally oriented.

On the other hand, on the second substrate 54, a black matrix layer 51 is formed to block incidence of light to a region other than the pixel regions, as shown in FIG. 7. Color filter layers 52 for reproducing R, G, and B color tones, and an overcoat layer 53 for planarizing color films of the color filter layers 52 are also formed on the second substrate 54.

The illustrated case corresponds to the optical mode of a general IPS mode LCD device, that is, a normally black mode. Accordingly, when no voltage is applied, the illustrated IPS mode LCD device is maintained in a black state in which transmission of light is prevented.

When a voltage is applied to the pixel electrode 45 and common electrode 44 formed on the same substrate, an electric field is generated between the two electrodes 44 and 45. The liquid crystals 55 are oriented along the electric field.

As a result, internal light passes through the liquid crystal layer along the oriented liquid crystals 55, so that white is displayed. In this case, since the liquid crystals 55 have positive dielectric anisotrophy, they have characteristics wherein the longer axis of the liquid crystals 55 are oriented in the direction of the electric field.

In an OFF state in which no in-plane electric field is applied to the common electrode 44 or pixel electrode 45 under the condition in which the liquid crystal panel is exposed to normal temperature conditions, the orientation of the liquid crystals 55 does not vary. However, in an ON state in which an in-plane electric field is applied to the common electrode 44 and pixel electrode 45, the orientation of the liquid crystals varies. That is, in the ON state, the liquid crystals 55 are oriented while having a twist angle of about 45°, contrary to the OFF state.

FIG. 7 is a simulation diagram illustrating a transmittance at each region of the LCD device in a black state (OFF state in which no voltage is applied to the pixel electrode and common electrode), under the condition in which it is assumed that each constituent element of the IPS mode LCD device according to the first embodiment is a dielectric having a corresponding dielectric constant. Referring to FIG. 7, it can be seen that leakage of light corresponding to a transmittance of about 30% (it is assumed that the white state corresponds to a transmittance of 100%) occurs at one side of the heat line 46.

Under low temperature conditions, a voltage of 30V or more is applied to the heater line 46, in order to heat the liquid crystal panel of the LCD device. As a result, a part of the liquid crystals 55 oriented in an initial horizontal state, that is, the liquid crystals 55 arranged around the heater line 46, are oriented along a vertical electric field generated by the heater line 46. Accordingly, the liquid crystals 55 arranged at the left side of the heater line 46 without being covered by the black matrix layer 51 are exposed, so that leakage of light occurs. Referring to the illustrated transmittance graph, it is seen that an increase in transmittance occurs at both sides, that is, the left and right sides, of the heater line 46. However, this result is caused by the simulation conducted under the condition in which it is simply assumed that the black matrix layer 51 is a dielectric. Taking into consideration the fact that the black matrix layer 51 practically has a light blocking property, it will be readily understood that leakage of light occurs only at the left side of the heater line 46.

The region where leakage of light occurs can be shielded by extending the black matrix layer 51 further to the left. In this case, however, loss of aspect ratio occurs. Unless such measure is provided, the LCD device has leakage of light that occurs in the black state.

Hereinafter, embodiments of the present invention for eliminating leakage of light caused by application of a heater line to an IPS mode LCD device will be described.

Second Embodiment

Figure 8:
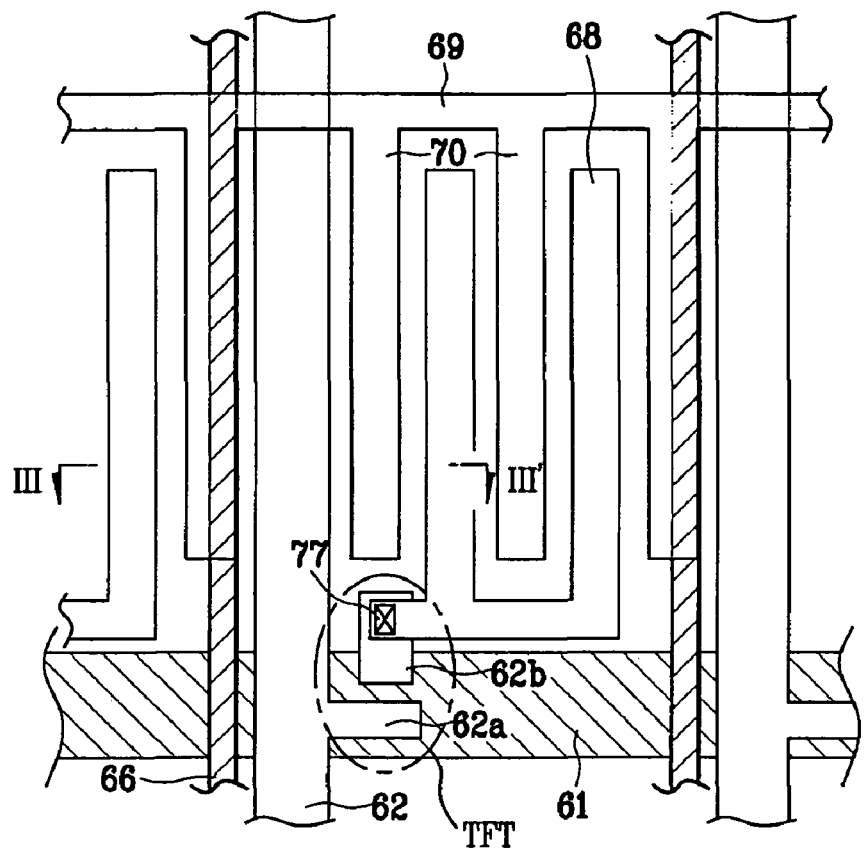
FIG. 8 is a plan view illustrating an IPS mode LCD device according to a second embodiment of the present invention.
Figure 9:
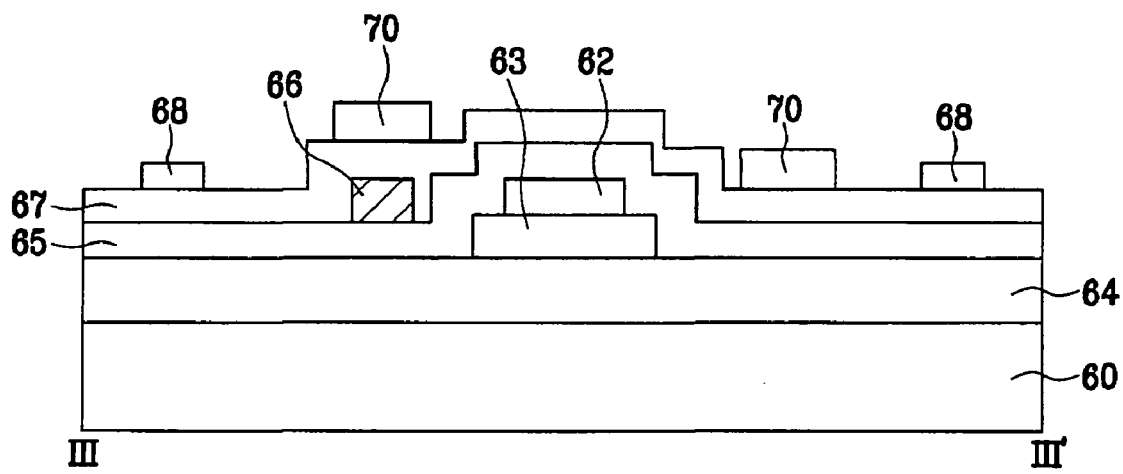
FIG. 9 is a cross-sectional view taken along the line III-III of FIG. 8.
Figure 10:
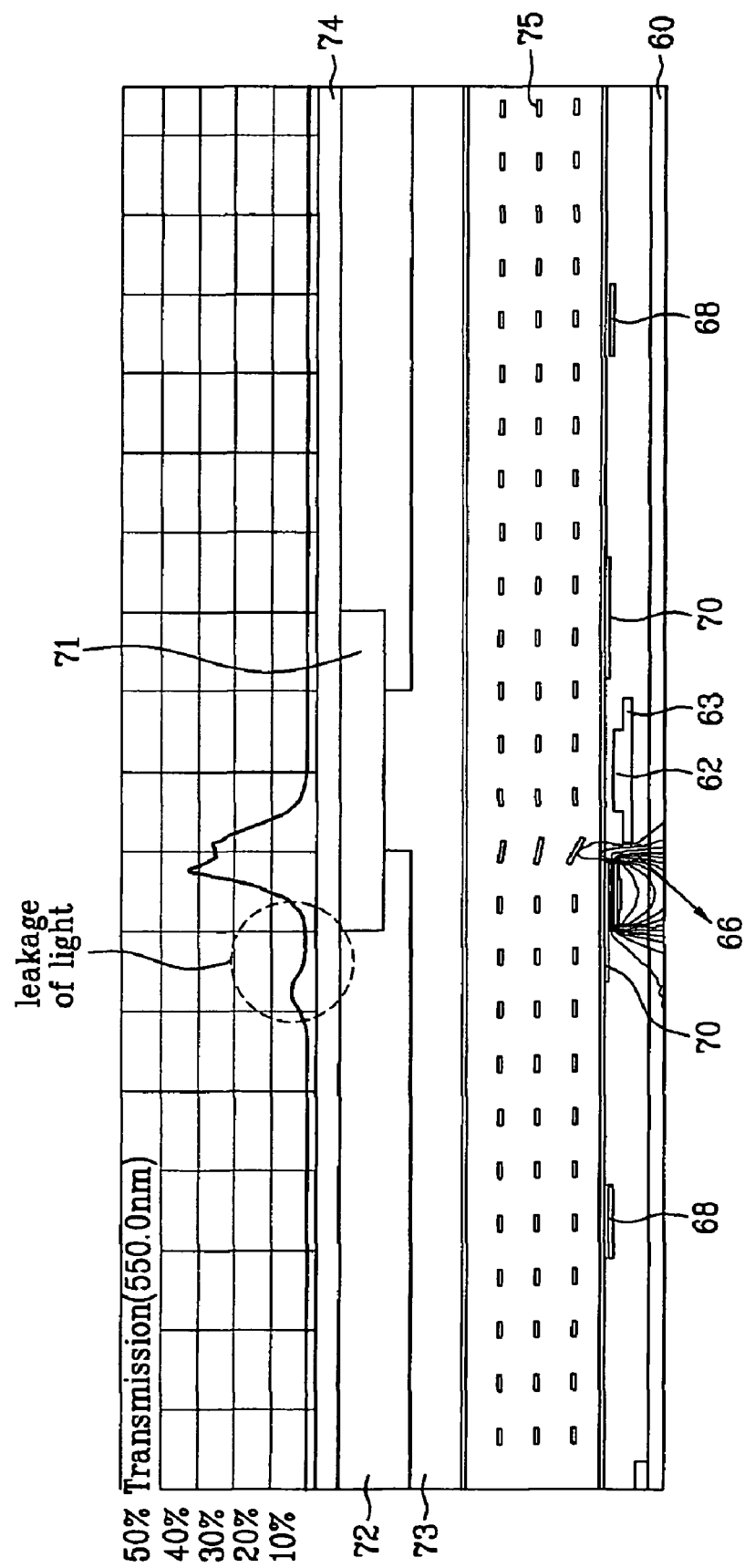
FIG. 10 is a simulation diagram illustrating a transmittance of the IPS mode LCD device according to the second embodiment of the present invention at each region of the IPS mode LCD device.

FIG. 8 is a plan view illustrating an IPS mode LCD device according to a second embodiment of the present invention. FIG. 9 is a cross-sectional view taken along the line III-III of FIG. 8. FIG. 10 is a simulation diagram illustrating a transmittance of the IPS mode LCD device according to the second embodiment of the present invention at each region of the IPS mode LCD device.

As shown in FIGS. 8 and 9, the IPS mode LCD device according to the second embodiment of the present invention mainly includes a first substrate 60, an second substrate ("74" in FIG. 10), which faces the first substrate 60, and a liquid crystal material ("75" in FIG. 10) sealed between the two substrates 60 and 74.

Gate lines 61 and data lines 62 are formed on the first substrate 60 such that the gate lines 61 and data lines 62 extend horizontally and vertically, respectively, to cross each other, thereby defining pixel regions. A common electrode 70 and a pixel electrode 68 are formed on the first substrate 60 at each pixel region such that the common electrode 70 and pixel electrode 68 are spaced apart from each other. Each of the common electrode 70 and the pixel electrode 68 has portions alternately arranged with portions of the other one of the common electrode 70 and the pixel electrode 68. For simplicity, the following description will be described only in conjunction with one pixel region. A heat line 66 is formed on the common electrode 70 adjacent to one side of the data line 62. The common electrode 70 and pixel electrode 68 extend parallel to the data line 62. The heater line 66 is formed on the layer on which the gate line 61 is formed. The IPS mode LCD device according to the second embodiment of the present invention has the same structure as that of the first embodiment, except that the heater line 66 is arranged on the layer, on which the gate line 61 is arranged, and the common electrode 70 is arranged on the layer on which the pixel electrode 68 is arranged.

A TFT is also formed on the first substrate 60. The TFT includes a gate electrode (not shown) protruded from the gate line 61, a source electrode 62a protruded from the data line 62, and a drain electrode 62b formed to be spaced apart from the source electrode 62a by a predetermined distance. Although not shown, the gate electrode is formed between the source electrode 62a and the drain electrode 62b. A semiconductor layer 63 is formed on the first substrate 60 beneath a region where the data line 62, source electrode 62a, and drain electrode 62b are arranged, and beneath a region defined between the source electrode 62a and the drain electrode 62b. The drain electrode 62b of the TFT is coupled to the pixel electrode 68 via a contact hole 77 which is formed through a second interlayer insulating film 67 and a first interlayer insulating film 65.

The common electrode 70 is protruded from a common line 69 extending parallel to the gate line 61, and is spaced apart from the pixel electrode 68 by the predetermined distance. The common electrode 70 is also formed on the layer on which the pixel electrode 68 is formed.

The IPS mode LCD device according to the second embodiment of the present invention is fabricated by forming layers each designated by the same title as that of the first embodiment, using the same material as that of the first embodiment, so that no further description thereof will be given.

On the other hand, on the second substrate 74, a black matrix layer 71 is formed to block incidence of light to a region other than the pixel regions, as shown in FIG. 10. Color filter layers 72 for reproducing R, G, and B color tones, and an overcoat layer 73 for planarizing color films of the color filter layers 72 are also formed on the second substrate 74.

The IPS mode LCD device according to the second embodiment corresponds to the optical mode of a general IPS mode LCD device, that is, a normally black mode. Accordingly, when no voltage is applied, the IPS mode LCD device is maintained in a black state in which transmission of light is prevented.

When a voltage is applied to the pixel electrode 68 and common electrode 70 formed on the same substrate, an electric field is generated between the two electrodes 68 and 70. The liquid crystals 75 are oriented along the electric field.

As a result, internal light passes through the liquid crystal layer along the oriented liquid crystals 75, so that white is displayed. In this case, since the liquid crystals 75 have positive dielectric anisotrophy, they have characteristics wherein the longer axis of the liquid crystals 75 are oriented in the direction of the electric field.

In an OFF state in which no in-plane electric field is applied to the common electrode 70 or pixel electrode 68, the orientation of the liquid crystals 75 does not vary.

FIG. 10 is a simulation diagram illustrating a transmittance at each region of the LCD device in a black state under the condition in which it is assumed that each constituent element of the IPS mode LCD device according to the second embodiment is a dielectric having a corresponding dielectric constant. Referring to FIG. 10, it can be seen that leakage of light corresponding to a transmittance of about 7 to 8% occurs at the left side of the heat line 66.

Under low temperature conditions, a voltage of 30V or more is applied to the heater line 66, in order to heat the liquid crystal panel of the LCD device. As a result, a part of the liquid crystals 75 oriented in an initial horizontal state, that is, the liquid crystals 75 arranged around the heater line 66, are oriented along a vertical electric field generated by the heater line 66. Accordingly, the liquid crystals 75 arranged at the left side of the heater line 66 without being covered by the black matrix layer 71 are exposed, so that leakage of light occurs. Referring to the illustrated transmittance graph, it is seen that an increase in transmittance occurs at both sides, that is, the left and right sides, of the heater line 66. In particular, it is seen that a higher transmittance is exhibited at the right side of the heater line 66 over which the common electrode 70 is not arranged.

Practically, the heater line 66 itself and the region arranged at the right side of the heater line 66 are covered by the black matrix layer 71, so that only the region arranged at the left side of the heater line 66 is exposed, as indicated as a region where leakage of light occurs in FIG. 10. Since the common electrode 70 covers the region over the heater line 66 in this case, the influence of electric flux generated around the heater line 66 in accordance with application of a voltage to the heater line 66 is reduced, as compared to the first embodiment. Accordingly, it is expected that orientation twisting of the liquid crystals is reduced. Consequently, it is expected that a very low transmittance is exhibited, so that reduced leakage of light is observed, as compared to the first embodiment.

Third Embodiment

Figure 11:
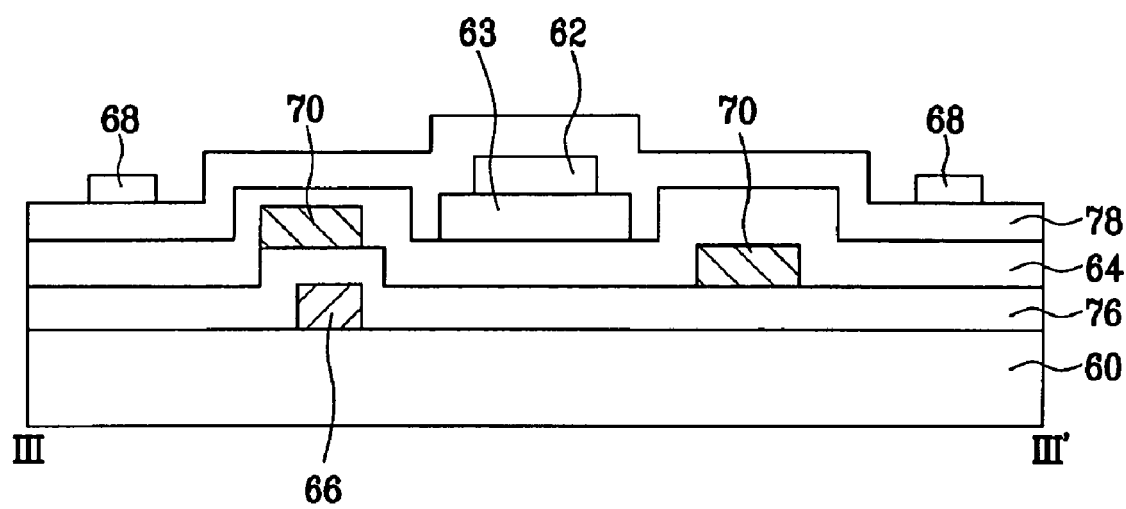
FIG. 11 is a sectional view illustrating an IPS mode LCD device according to a third embodiment of the present invention.
Figure 12:
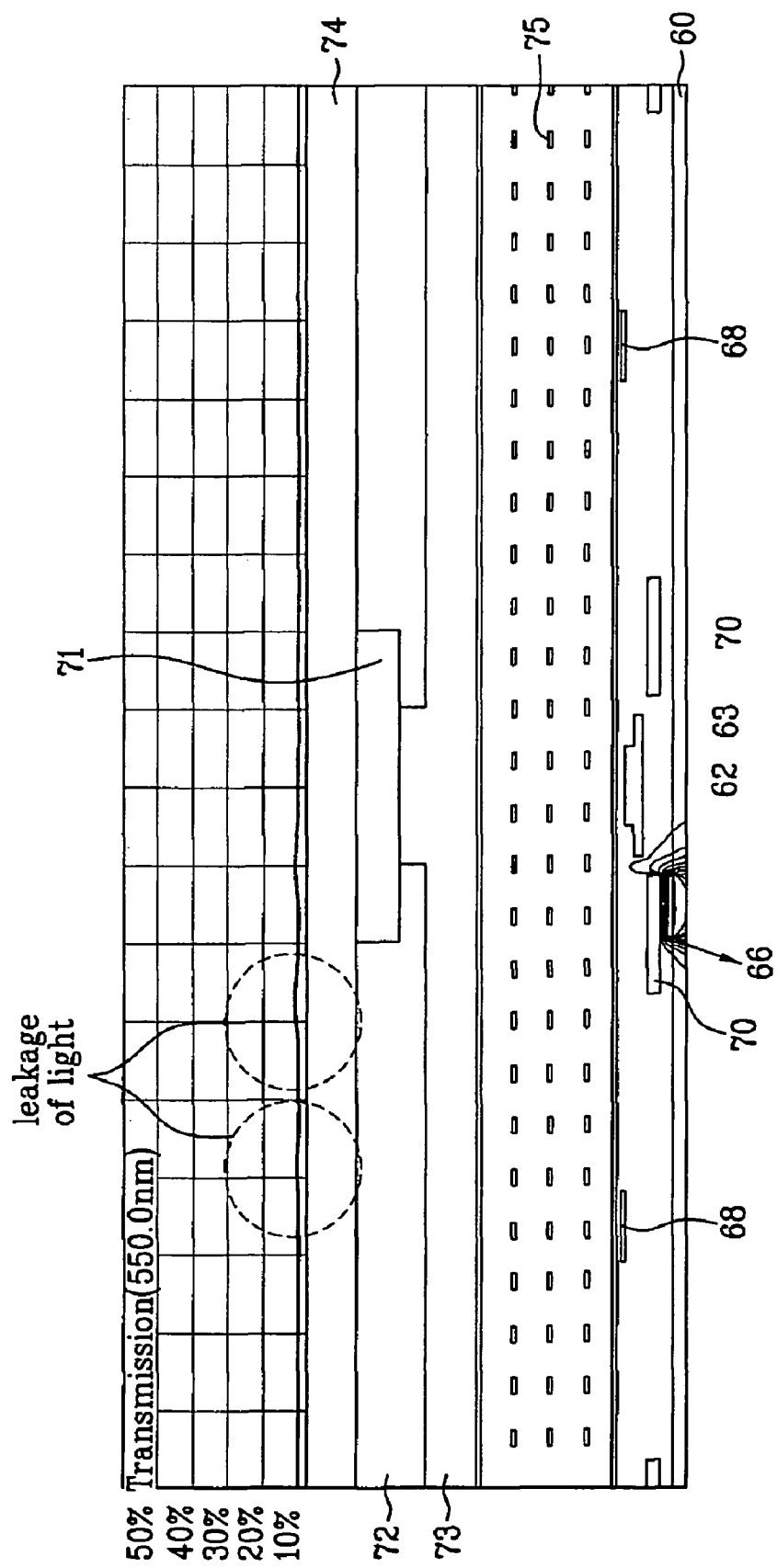
FIG. 12 is a simulation diagram illustrating a transmittance of the IPS mode LCD device according to the third embodiment of the present invention at each region of the IPS mode LCD device.

FIG. 11 is a sectional view illustrating an IPS mode LCD device according to a third embodiment of the present invention. FIG. 12 is a simulation diagram illustrating a transmittance of the IPS mode LCD device according to the third embodiment of the present invention at each region of the IPS mode LCD device.

As shown in FIG. 11, the IPS mode LCD device according to the third embodiment of the present invention mainly includes a first substrate 60, an second substrate ("74" in FIG. 12), which faces the first substrate 60, and a liquid crystal material ("75" in FIG. 12) sealed between the two substrates 60 and 74.

Gate lines 61 and data lines 62 are formed on the first substrate 60 such that the gate lines 61 and data lines 62 extend horizontally and vertically, respectively, to cross each other, thereby defining pixel regions. A common electrode 70 and a pixel electrode 68 are formed on the first substrate 60 at each pixel region such that the common electrode 70 and pixel electrode 68 are spaced apart from each other. Each of the common electrode 70 and the pixel electrode 68 has portions alternately arranged with portions of the other one of the common electrode 70 and the pixel electrode 68. For simplicity, the following description will be described only in conjunction with one pixel region. A heat line 66 is formed on the common electrode 70 adjacent to one side of the data line 62. The heater line 66 is formed on a lowermost layer, that is, the first substrate 60, differently from the second embodiment. Since the third embodiment of the present invention has the same configuration as that of the second embodiment, except for the arrangement of the heater line 66, the same reference numeral is given to the layers having the same function, and no description thereof will be given.

That is, in the IPS mode LCD device according to the third embodiment of the present invention, the heater line 66 is formed on the lowermost layer of the LCD device. An insulating film 76 is formed over the entire surface of the resultant structure including the heater line 66. Thereafter, a general structure of the IPS mode LCD device is formed on the insulating film 76. Since the heater line 66 is substantially covered by the common electrode 70, it is possible to effectively prevent the light leakage problem incurred in the first embodiment.

FIG. 12 is a simulation diagram illustrating a transmittance at each region of the LCD device in a black state (prior to application of a voltage to the common electrode and pixel electrode) under the condition in which it is assumed that each constituent element of the IPS mode LCD device according to the second embodiment is a dielectric having a corresponding dielectric constant. Referring to FIG. 12, it can be seen that slight leakage of light occurs at the left side of the heat line 66.

Under low temperature conditions, a voltage of 30V or more is applied to the heater line 66, in order to heat the liquid crystal panel of the LCD device. As a result, a part of the liquid crystals 75 oriented in an initial horizontal state, that is, the liquid crystals 75 arranged around the heater line 66, are oriented along a vertical electric field generated by the heater line 66. Accordingly, the liquid crystals 75 arranged at the left side of the heater line 66 without being covered by the black matrix layer 71 are exposed, so that leakage of light occurs. Referring to the illustrated transmittance graph, it is seen that leakage of light corresponding to a transmittance of about 1 to 3% occurs at the light leaked region. The reason why the light leakage occurring in the case of the third embodiment is less than those of the first and second embodiments is that the heater line 66 is spaced apart from the liquid crystals 75 by a maximal distance while being covered by the light-shielding common electrode 70.

As described above, it was observed that, although the heater line is arranged over or beneath the common electrode in the above-described embodiments, leakage of light occurs at a certain region of the LCD device. Hereinafter, an embodiment of the present invention capable of completely preventing leakage of light caused by the use of the heater line will be described.

Fourth Embodiment

Figure 13:
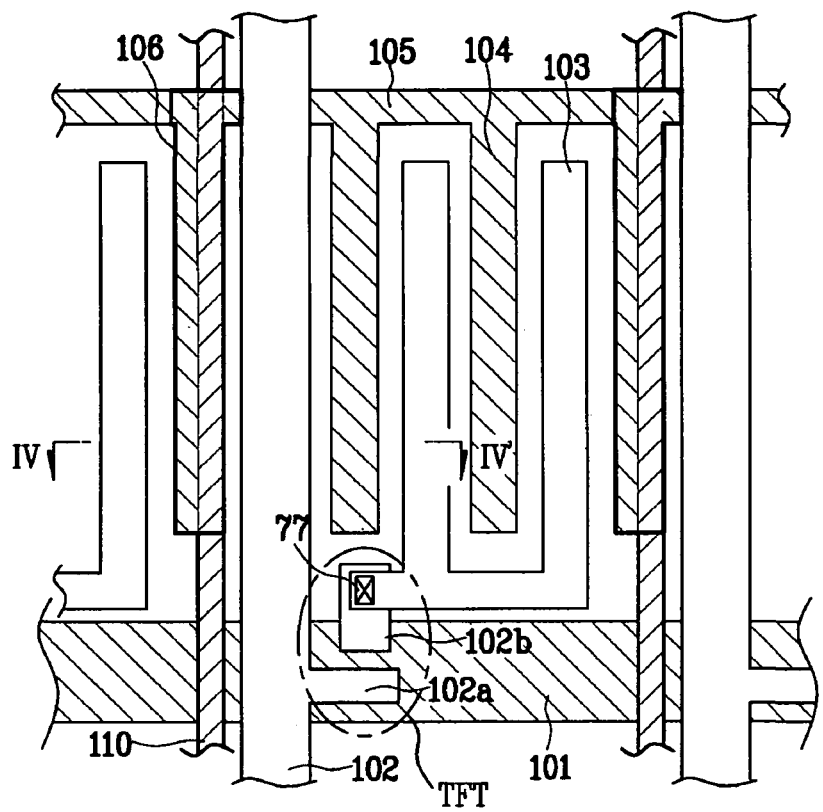
FIG. 13 is a plan view illustrating an IPS mode LCD device according to a fourth embodiment of the present invention.
Figure 14:
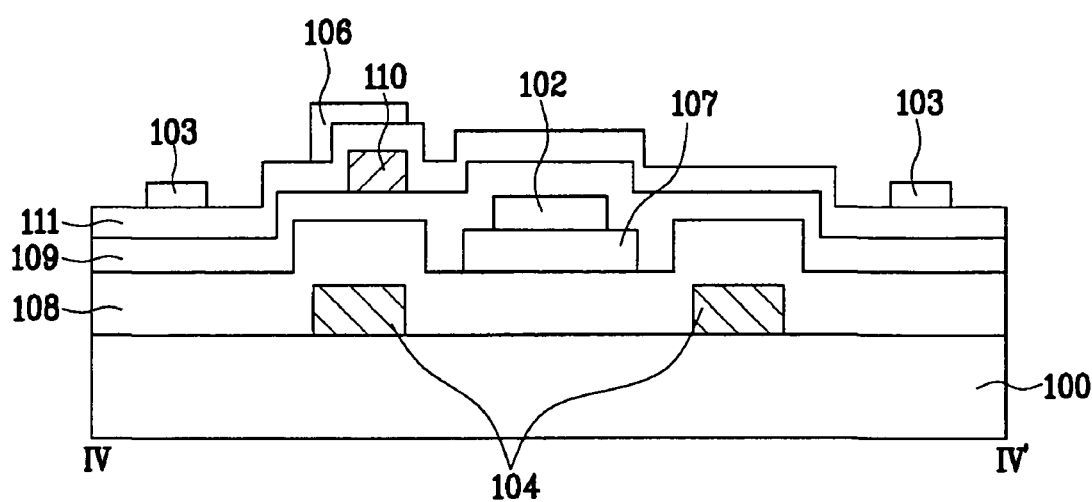
FIG. 14 is a cross-sectional view taken along the line IV-IV of FIG. 13.

FIG. 13 is a plan view illustrating an IPS mode LCD device according to a fourth embodiment of the present invention. FIG. 14 is a cross-sectional view taken along the line IV-IV of FIG. 13. FIG. 15 is a simulation diagram illustrating a transmittance of the IPS mode LCD device according to the fourth embodiment of the present invention at each region of the IPS mode LCD device.

As shown in FIGS. 13 and 14, the IPS mode LCD device according to the fourth embodiment of the present invention mainly includes a first substrate 100, an second substrate ("140" in FIG. 7), which faces the first substrate 100, and a liquid crystal material ("130" in FIG. 7) sealed between the two substrates 100 and 140.

Gate lines 101 and data lines 102 are formed on the first substrate 100 such that the gate lines 101 and data lines 102 extend horizontally and vertically, respectively, to cross each other, thereby defining pixel regions. A first common electrode 104 and a pixel electrode 103 are formed on the first substrate 100 at each pixel region such that the first common electrode 104 and pixel electrode 103 are spaced apart from each other. Each of the common electrode 104 and the pixel electrode 103 has portions alternately arranged portions of the other one of the common electrode 104 and the pixel electrode 103. For simplicity, the following description will be described only in conjunction with one pixel region. A heat line 110 is formed on the first common electrode 104 adjacent to one side of the data line 102.

A second common electrode 106 is formed on a layer, on which the pixel electrode 103 is arranged, such that the second common electrode 106 is arranged over the heater line 110. The second common electrode 106 has a width relatively larger than that of the heater line 110, but equal to or smaller than that of the first common electrode 104 arranged beneath the heater line 1100. The first common electrode 104, pixel electrode 103, and second common electrode 106 extend parallel to the data line 102.

A TFT is also formed on the first substrate 100. The TFT includes a gate electrode (not shown) protruded from the gate line 101, a source electrode 102a protruded from the data line 102, and a drain electrode 102b formed to be spaced apart from the source electrode 102a by a predetermined distance. Although not shown, the gate electrode is formed between the source electrode 102a and the drain electrode 102b. A semiconductor layer 107 is formed on the first substrate 100 beneath a region where the data line 102, source electrode 102a, and drain electrode 102b are arranged, and beneath a region defined between the source electrode 102a and the drain electrode 102b. The drain electrode 102b of the TFT is coupled to the pixel electrode 103 via a contact hole 57 which is formed through a second interlayer insulating film 111 and a first interlayer insulating film 109.

The first common electrode 104 is protruded from a common line 43 extending parallel to the gate line 101, and is spaced apart from the pixel electrode 103 by the predetermined distance. The first common electrode 104 is also formed on a layer, on which the gate line 101 or data line 102 is formed, simultaneously with the formation of the gate line 101 or data line 102. In the illustrated case, the first common electrode 104 is formed, together with the common line 105, on the layer on which the gate line 101 is formed. Also, the second common electrode 106 is formed on the layer on which the pixel electrode 103 is formed. The first common electrode 104 is made of light-shielding metal such as aluminum (Al), chromium (Cr), molybdenum tungsten (MoW), copper (Cu), or copper alloy, similarly to the gate line 101 and data line 102. The second common electrode 106 is made of transparent metal such as indium tin oxide (ITO), indium zinc oxide (IZO), or indium tin zinc oxide (ITZO), similarly to the pixel electrode 103. The heater line 110 is made of light-shielding metal such as aluminum (Al), chromium (Cr), molybdenum tungsten (MoW), copper (Cu), or copper alloy, similarly to the gate line 101.

The second common electrode 106 is formed over a region where the heater line 110 is arranged, in order to cover the heater line 110. The second common electrode 106 has a width equal to or larger than that of the first common electrode 104. Accordingly, it is possible to completely shield electric flux generated around the heater line 110 in accordance with application of a voltage to the heater line 110 because the heater line 100 is completely covered at both the upper and lower sides thereof. Thus, abnormal orientation of the liquid crystals caused by the electric flux is prevented.

The IPS mode LCD device according to the fourth embodiment of the present invention is fabricated using the same processes as those of the first through third embodiments, and the same materials for the layers each designated by the same title as that of the first through third embodiments, except that the heater line 110 has a sandwiched structure such that the second common electrode 106 covers the upper side of the heater line 110, and the first common electrode 104 covers the lower side of the heater line 110. Accordingly, no further description will be given.

On the other hand, on the second substrate 140, a black matrix layer 120 is formed to block incidence of light to a region other than the pixel regions, as shown in FIG. 15. Color filter layers 121 for reproducing R, G, and B color tones, and an overcoat layer 122 for planarizing color films of the color filter layers 121 are also formed on the second substrate 140.

The illustrated case corresponds to the optical mode of a general IPS mode LCD device, that is, a normally black mode. Accordingly, when no voltage is applied, the illustrated IPS mode LCD device is maintained in a black state in which transmission of light is prevented.

When a voltage is applied to the pixel electrode 103 and first common electrode 104 formed on the same substrate, an electric field is generated between the two electrodes 103 and 104. The liquid crystals 130 are oriented along the electric field.

As a result, internal light passes through the liquid crystal layer along the oriented liquid crystals 130, so that white is displayed. In this case, since the liquid crystals 130 have positive dielectric anisotrophy, they have characteristics wherein the longer axis of the liquid crystals 130 are oriented in the direction of the electric field.

In an OFF state in which no in-plane electric field is applied to the first common electrode 104 or pixel electrode 103 under the condition in which the liquid crystal panel is exposed to normal temperature conditions, the orientation of the liquid crystals 130 does not vary.

FIG. 15 is a simulation diagram illustrating a transmittance at each region of the LCD device in a black state (OFF state in which no voltage is applied to the pixel electrode and common electrode), under the condition in which it is assumed that each constituent element of the IPS mode LCD device according to the fourth embodiment is a dielectric having a corresponding dielectric constant. Referring to FIG. 15, it can be seen that leakage of light does not occur at any region around the heat line 110.

Under low temperature conditions, a voltage of 30 to 100V is applied to the heater line 110, in order to heat the liquid crystal panel of the LCD device. Although such a high voltage is applied to the heater line 110, the first and second common electrodes 104 and 106 arranged over and beneath the heater line 110 shield electric field components generated around the heater line 110, thereby preventing the liquid crystals 130 from being influenced by affects caused by the heater line 110. Accordingly, the liquid crystals 130 arranged over and around the heater line 110 are not influenced by electric flux generated when a voltage is applied to the heater-line 110. Thus, leakage of light is not observed.

Referring to FIG. 15, it can be seen that the second common electrode 104 is also formed at the right side of the data line 102, differently from FIG. 14. This is because the LCD device was simulated such that the second common electrode 106 has a structure symmetrical with reference to the data line 102. Practically, this dummy region is not influenced by the electric flux caused by the heater line 110, so that abnormal orientation of the liquid crystals 130 does not occur at the dummy region. Accordingly, this simulated case has the same results as those of the practical case in which the second common electrode 106 is formed only at a region where the heater line 110 is arranged. Furthermore, the dummy region is completely covered by the black matrix layer 120. Therefore, no further discussion will be given.

The reason why a voltage is applied to the heater line 110 is to heat the liquid crystal panel prior to the driving thereof. A voltage higher than a drive voltage applied to the pixel electrode 103 or first common electrode 104, for example, about 30 to 100V, is applied. The application of the voltage to the heater line 110 is carried out after the temperature sensor arranged in the liquid crystal panel senses a low temperature state of the liquid crystal panel.

Specifically, the temperature sensor is arranged at a non-display region of the first substrate 100 or second substrate 140 in the liquid crystal panel.

The above-described IPS mode LCD device according to the present invention has various effects.

First, in the IPS mode LCD device in which the heater line is arranged over or beneath the common electrode at one side of the data line in accordance with the present invention, a voltage is applied to the heater line to pre-heat the liquid crystal panel when the liquid crystal panel is in a low temperature state. In this case, accordingly, the liquid crystal panel can be driven in a normal temperature state.

Second, in the IPS mode LCD device in which the heater line is arranged over the common electrode at one side of the data line, or is sandwiched between the common electrodes arranged at one side of the data line and in parallel to the data line in accordance with the present invention, it is possible to prevent abnormal orientation of liquid crystals arranged around the heater line when a voltage is applied to the heater line to pre-heat the liquid crystal panel because the common electrode or common electrodes shield electric flux generated around the heater line. Accordingly, it is possible to prevent leakage of light in a black state.

Thus, in accordance with the present invention, it is possible to prevent the liquid crystals from being influenced by electric flux generated around the heater line when a voltage is applied to the heater line to pre-heat the liquid crystal panel, which is in a low temperature state, by arranging one common electrode over the heat line, or by arranging a pair of common electrodes at the upper and lower sides of the heater line, respectively, such that the heater line is sandwiched between the common electrodes. Accordingly, it is possible to prevent a degradation in the quality of the LCD device caused by leakage of light.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An in-plane switching mode liquid crystal display device comprising:
   a first substrate and a second substrate which face each other;
   gate line and a data line which are formed on the first substrate such that the gate line and the data line cross each other to define a pixel region;
   first common electrode and a pixel electrode which are formed on the first substrate in the pixel region;
   heater line formed on the first substrate beneath the first common electrode and adjacent to the data line; and
   a liquid crystal layer formed between the first substrate and the second substrate.

2. The in-plane switching mode liquid crystal display device according to claim 1, wherein the first common electrode is formed on a layer on which the pixel electrode is formed, each of the first common electrode and the pixel electrode has portions alternately arranged with portions of the other one of the first common electrode and the pixel electrode, and the heater line is substantially parallel to one portion of the first common electrode.

3. The in-plane switching mode liquid crystal display device according to claim 1, wherein the first common electrode is formed on a layer on which the gate line is formed.

4. The in-plane switching mode liquid crystal display device according to claim 1, further comprising:
   a second common electrode formed on the first substrate beneath the heater line.

5. The in-plane switching mode liquid crystal display device according to claim 4, wherein the first common electrode is formed on a layer on which the pixel electrode is formed, and the second common electrode is formed on a layer on which the gate line is formed.

6. The in-plane switching mode liquid crystal display device according to claim 5, wherein the first common electrode is made from a transparent electrode material, and the second common electrode is made from a light-shielding metal.

7. The in-plane switching mode liquid crystal display device according to claim 1, wherein the first common electrode has a first width larger than a second width of the heater line.

8. The in-plane switching mode liquid crystal display device according to claim 1, wherein a high voltage approximately equal to or greater than a drive voltage is applied to the heater line.

9. The in-plane switching mode liquid crystal display device according to claim 8, wherein the high voltage is between approximately 30 volts and approximately 100 volts.

10. The in-plane switching mode liquid crystal display device according to claim 8, wherein the application of the high voltage is carried out after a low temperature approximately equal to or below a predetermined value is sensed by a temperature sensor disposed on the first substrate or the second substrate.

11. The in-plane switching mode liquid crystal display device according to claim 1, wherein the heater line is made from a light-shielding metal.

12. The in-plane switching mode liquid crystal display device according to claim 1, wherein the pixel electrode and the first common electrode extend substantially parallel to the data line.

13. A method for fabricating a liquid crystal display device, comprising:
    fabricating a gate line and a data line on a first substrate such that the gate line and the data line cross each other to define a pixel region;
    fabricating a first common electrode and a pixel electrode on the first substrate in the pixel region, the first common electrode having a first common electrode portion adjacent to the data line;
    fabricating a heater line on the first substrate that substantially parallels the first common electrode portion, wherein the heater line is disposed beneath the first common electrode portion such that the first common electrode portion substantially covers the heater line;
    fabricating a second common electrode on the first substrate, wherein the second common electrode substantially parallels the heater line, the heater line being disposed between the first and second common electrodes; and
    fabricating a liquid crystal layer, wherein the liquid crystal layer is disposed between the first substrate and a second substrate.

14. The method of claim 13, wherein the heater line is made from a light-shielding metal.

15. The method of claim 13, wherein the first common electrode is made from a light-shielding metal, and the pixel electrode is made from a transparent electrode material.

16. The method of claim 13, comprising fabricating the first common electrode and the pixel electrode on the same layer.

17. The method of claim 13, comprising fabricating the first common electrode, the pixel electrode, and the heater line on different layers.

* * * * *

UNITED STATES PATENT AND TRADEMARK OFFICE
CERTIFICATE OF CORRECTION

PATENT NO. : 7,483,087 B2  Page 1 of 1
APPLICATION NO. : 11/169042
DATED : January 27, 2009
INVENTOR(S) : Hyun Suk Jin et al.

It is certified that error appears in the above-identified patent and that said Letters Patent is hereby corrected as shown below:

<u>In the Claims</u>

In column 15, claim 1, line 26, before "gate line and a data" insert --a--.

In column 15, claim 1, line 29, before "first common electrode" insert --a--.

In column 15, claim 1, line 31, before "heater line formed" insert --a--.

Signed and Sealed this

Twenty-third Day of June, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,483,087 B2 | Page 1 of 1 |
| APPLICATION NO. | : 11/169042 | |
| DATED | : January 27, 2009 | |
| INVENTOR(S) | : Jin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 882 days.

Signed and Sealed this
First Day of March, 2011

David J. Kappos
*Director of the United States Patent and Trademark Office*